(12) United States Patent
Tsubouchi (10) Patent No.: US 9,245,302 B2
(45) Date of Patent: Jan. 26, 2016

(54) ACCOMPANIMENT DETERMINATION APPARATUS, ACCOMPANIMENT DETERMINATION METHOD, AND COMPUTER READABLE STORAGE MEDIUM (71) Applicant: YAHOO JAPAN CORPORATION, Tokyo (JP)

(72) Inventor: Kota Tsubouchi, Tokyo (JP)

(73) Assignee: YAHOO JAPAN CORPORATION, Tokyo (JP)

( * ) Notice: Subject to any disclaimer, the term of this patent is extended or adjusted under 35 U.S.C. 154(b) by 93 days.

(21) Appl. No.: 14/297,027

(22) Filed: Jun. 5, 2014

(65) Prior Publication Data

US 2014/0375450 A1   Dec. 25, 2014

(30) Foreign Application Priority Data

Jun. 20, 2013  (JP) ................................ 2013-129497

(51) Int. Cl.
*G08B 1/08* (2006.01)
*G06Q 50/00* (2012.01)
*G06Q 10/08* (2012.01)

(52) U.S. Cl.
CPC ............ *G06Q 50/01* (2013.01); *G06Q 10/0833* (2013.01)

(58) Field of Classification Search
CPC ............................. G01C 22/006; G08B 21/22
USPC ............... 340/539.11, 573.1, 539.13, 539.15, 340/539.21, 539.23, 3.1, 3.21, 4.2, 5.1, 5.8, 340/5.81, 8.1; 702/160
See application file for complete search history.

(56) References Cited

FOREIGN PATENT DOCUMENTS

| JP | A-2011-40063 | 2/2011 |
|----|--------------|--------|
| JP | 2012-003322 A | 1/2012 |
| JP | 2012-123702 A | 6/2012 |

OTHER PUBLICATIONS

Apr. 16, 2015 Office Action issued in Japanese Application No. 2013-129497.

*Primary Examiner* — Toan N Pham
(74) *Attorney, Agent, or Firm* — Oliff PLC (57) ABSTRACT

An accompaniment determination apparatus includes a past sensor information memory configured to store past sensor information, the past sensor information acquired by sensors respectively worn by two or more users, a sensor information receiver configured to receive sensor information from the sensor worn by each of two or more users, an accompanying user determiner configured to determine at a determination time point whether two or more users are accompanying each other, using the past sensor information and the received sensor information, and an output unit configured to output information indicating a result of the determining. The accompaniment determination apparatus thus determines on a real-time basis whether the two or more users are accompanying each other using the sensor information without collecting position information.

8 Claims, 5 Drawing Sheets

ACCOMPANIMENT DETERMINATION APPARATUS, ACCOMPANIMENT DETERMINATION METHOD, AND COMPUTER READABLE STORAGE MEDIUM

CROSS-REFERENCE TO RELATED APPLICATIONS

The present invention contains subject matter related to Japanese Patent Application No. 2013-129497 filed in the Japan Patent Office on Jun. 20, 2013, the entire contents of which are incorporated herein by reference.

BACKGROUND OF THE INVENTION

1. Field of the Invention

The present invention relates to an accompaniment determination apparatus configured to determine whether a user is accompanying another user.

2. Description of the Related Art

Real-time determination is performed to determine whether one is accompanying another user. For example, Japanese Unexamined Patent Application Publication No. 2011-40063 discloses an apparatus that acquires information related to surroundings of a user using position information acquired by a sensor worn by the user.

Such a related art technique based on position information is used to determine whether two or more users are accompanying each other. The related art technique of collecting a track of the user involves high costs to protect privacy of the user.

SUMMARY OF THE INVENTION

A simple mechanism is desirable to determine on a real-time basis with sufficient privacy ensured whether two or more users are accompanying each other.

According to a first aspect of the present invention, an accompaniment determination apparatus is provided. The accompaniment determination apparatus includes a past sensor information memory configured to store past sensor information, the past sensor information associating observation information acquired by sensors respectively worn by two or more users with time point information indicating a time point at which the observation information is acquired, a sensor information receiver configured to receive sensor information from the sensor worn by each of the two or more users, an accompanying user determiner configured to determine at a determination time point indicating the latest time point included in the sensor information whether the two or more users wearing the sensors from which the sensor information is acquired are accompanying each other, using the past sensor information and the sensor information received by the sensor information receiver, and an output unit configured to output information indicating a determination result determined by the accompanying user determiner.

The accompanying user determiner in the accompaniment determination apparatus may include a sensor information prediction unit configured to acquire predictive sensor information as the sensor information at the determination time point and thereafter corresponding to the sensor information, using the sensor information received by the sensor information receiver and the past sensor information, a similarity information calculation unit configured to calculate similarity information related to similarity between a set of observation information, corresponding to time point information at the determination time point, the set of observation information included in a set of the sensor information received by the sensor information receiver and the predictive sensor information corresponding to the received sensor information, and an accompaniment determination unit configured to determine at the determination time point whether the two or more users wearing the sensors having acquired the observation information used to calculate the similarity information are accompanying each other if the similarity information is similar enough to satisfy a predetermined condition.

The accompanying user determiner in the accompaniment determination apparatus determiner may further include a machine learning unit configured to perform machine learning with the past sensor data stored on the past sensor information memory serving as teacher data to acquire learning result information. The sensor information prediction unit acquires the predictive sensor information corresponding to the sensor information using the sensor information received by the sensor information receiver and the learning result information.

The accompaniment determination apparatus may further include a time point added information receiver configured to receive time point added information, as information related to a user, at a time point indicated by time point information included in the sensor information received by the sensor information receiver. The past sensor information memory also stores the time point added information at a time point related to the past sensor information. The machine learning unit performs machine learning also using the time point added information stored on the past sensor information memory. The sensor information prediction unit acquires the predictive sensor information also using the time point added information received by the time point added information receiver.

The similarity information calculation unit may calculate the similarity information at the determination time point using a plurality of observation information sets respectively corresponding to pieces of time point information indicating time points included in a sampling period including a time point prior to the determination time point and a time point subsequent to the determination time point.

The similarity information calculation unit may calculate the similarity information that is a sum of values related to a difference between two or more pieces of observation information included in each of the observation information sets respectively corresponding to the pieces of time point information indicating time points included in the sampling period including the determination time point.

DETAILED DESCRIPTION OF THE PREFERRED EMBODIMENTS

Embodiments of an accompaniment determination apparatus are described with reference to the drawings. In the following discussion, like elements operate in the same manner, and the discussion of any element, once described, is omitted as appropriate.

An accompaniment determination apparatus 1 of an embodiment described below determines on a real-time basis whether two or more users wearing respectively sensors having acquired sensor information are accompanying each other, using information from two or more pieces of sensor information. The word group "determines on a real-time basis" refers a determination performed at a time point indicated by the latest time point information included in the received sensor information.

Figure 1:
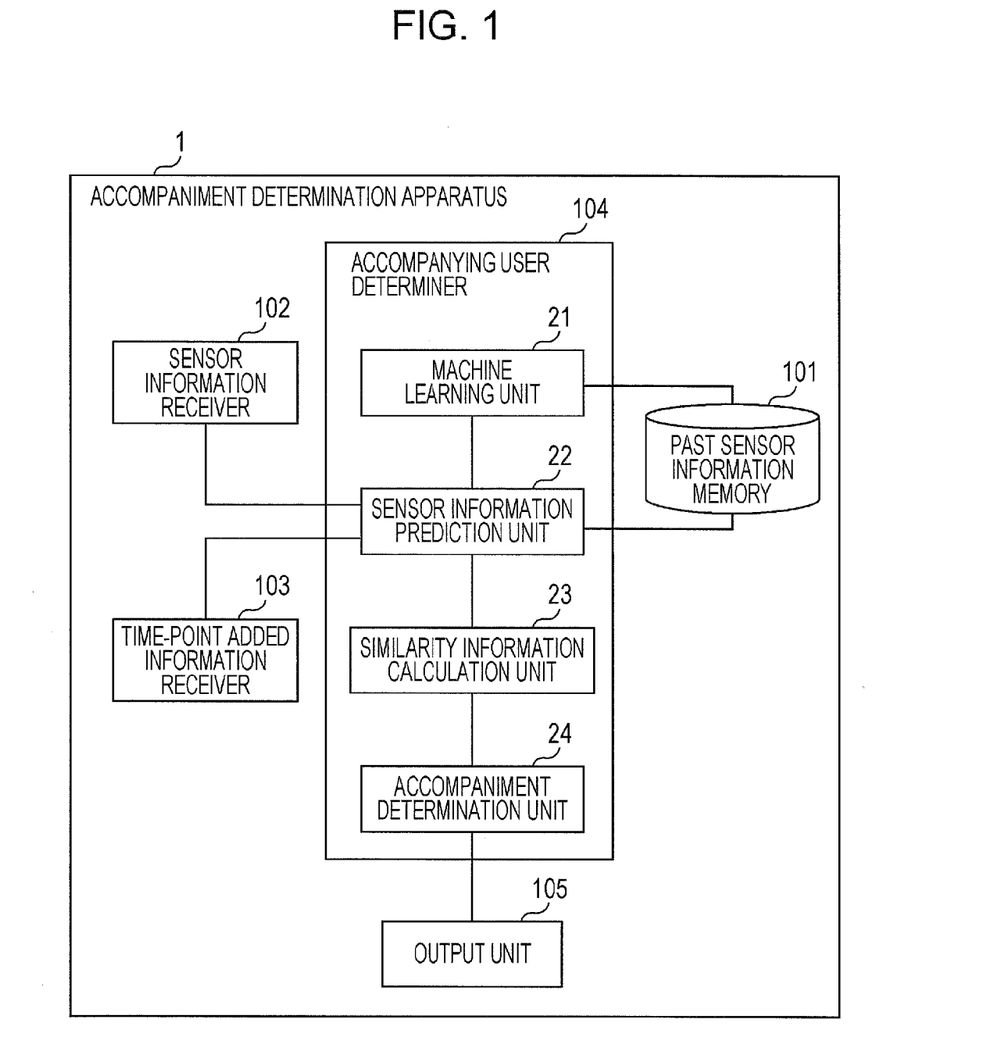
FIG. 1 is a block diagram illustrating an accompaniment determination apparatus of an embodiment.

FIG. 1 is a block diagram illustrating the accompaniment determination apparatus 1 of the embodiment. The accompaniment determination apparatus 1 includes a past sensor information memory 101, a sensor information receiver 102, a time point added information receiver 103, an accompanying user determiner 104, and an output unit 105. The accompanying user determiner 104 includes a machine learning unit 21, a sensor information prediction unit 22, a similarity information calculation unit 23, and an accompaniment determination unit 24.

The past sensor information memory 101 stores past sensor information. The past sensor information may be two or more pieces of sensor information itself of sensors respectively worn by two or more users, or information related to the two pieces of sensor information. The sensor information includes at least a set of observation information acquired by the sensor and time point information indicating a time point at which the observation information is acquired. The past sensor information stored on the past sensor information memory 101 preferably associates the sensor information with a user wearing the sensor having acquired the sensor information using user identification information to be discussed below.

The sensor may be an acceleration sensor that detects acceleration, a gyro sensor that detects an angular velocity, an illuminance sensor that detects illuminance, a geomagnetic sensor that detects the direction of a magnetic field, a temperature sensor that detects a temperature, a humidity sensor that detects humidity, or a pressure sensor that detects atmospheric pressure. Furthermore, the sensor may be an accelerometer, a pedometer, or a calorie consumption meter. In other words, the observation information acquired by the sensor may be information indicating detected acceleration, or information calculated from the detected acceleration. The information calculated from the acceleration may be the number of steps taken by a user using the accelerometer, or an amount of calorie consumed by the user and acquired by the accelerometer. The following discussion is based on the premise that the sensor is a pedometer. The pedometer may be of a type of counting the number of steps by detecting acceleration through an acceleration sensor, or of a type of counting the number of steps by detecting acceleration through the swing of a pendulum. Since these pedometers count the number of steps based on acceleration, it is understood that the number of steps is acquired using the accelerometer.

Time point information associated with the observation information may be information indicating an instantaneous time point or information indicating a duration of time having a time width. The information of the instantaneous time point indicates one point in the time axis. If the time point information indicates a duration of time having a time width, the time point information may indicate one hour, one minute, or one second, or a duration of time having another time width. The time point information may indicate a duration of from 10 hours 00 minutes 00 seconds to 10 hours 59 minutes 59 second, 99 . . . . The "association between the observation information and the time point information" may be in a one-to-one correspondence, or in a multi-to-one correspondence. For example, the sensor information may associate the time point information "from 12:00, Jul. 1, 2013 to 12:01, Jul. 1, 2013" with a single piece of observation information "100 steps", or 100 pieces of observation information "one step". If the past sensor information memory 101 stores two or more pieces of sensor information, the following discussion is based on the premise that the sensor information described above is stored on the past sensor information memory 101 in the one-to-one correspondence. If the sensor information in the multi-to-one correspondence is received, the sensor information receiver 102 may convert the received sensor information into sensor information in the one-to-one correspondence. The following discussion is based on the premise that the sensor information is in the one-to-one correspondence. The sensor information may or may not include a plurality of pieces of time point information indicating the same time point. The word group "includes the plurality of pieces of time point information indicating the same time point" is intended to mean that the time point information and the observation information "one step" are acquired in association with each other at each step. If two or more pieces of sensor information are stored on the past sensor information memory 101, it is assumed that the sensor information in the one-to-one correspondence is stored on the past sensor information memory 101. If the sensor information including the plurality of pieces of time point information indicating the same time point is received, the sensor information receiver 102 may merge the time point information and the observation information corresponding thereto so that the time point information indicating the same time point is not duplicated. The verb "merge" is intended to mean that the plurality of pieces of time point information indicating the same time point are unified and that the observation information associated with the plurality of pieces of time point information is re-associated with the unified time point information. The following discussion is based on the premise that the sensor information does not include a plurality of pieces of time point information indicating the same time point. The sensor information may or may not include user identification information identifying a user wearing a sensor from which the sensor information has been acquired. The user identification information may be any information as long as the information uniquely identifies the user. For example, the user identification information is preferably the name of the user. Alternatively, the user identification information may be identification (ID) indicating the user, or a telephone number. The user identification information may be information identifying the sensor as long as a single user continues to use the sensor.

The sensor information stored on the past sensor information memory 101 may be answer attached sensor information. The answer attached sensor information allows two or more pieces of sensor information to indicate a duration throughout which two or more users corresponding to the two or more pieces of sensor information are accompanying each other. The answer attached sensor information may be any information as long as the information indicates the duration throughout which the users corresponding to the two or more pieces of sensor information are accompanying each other, and also indicates the observation information corresponding to the time point information included in the duration. For example, the answer attached sensor information may include, in a form with one piece of information attached to another piece, each of the two or more pieces of sensor information and each piece of information indicating the duration throughout which the two or more users corresponding to the sensor information are accompanying each other.

Alternatively, the answer attached sensor information may be the sensor information including only the observation information corresponding to the time point information included in the accompaniment duration. The past sensor information memory 101 may store two or more pieces of answer attached sensor information. If the past sensor information memory 101 stores two or more pieces of answer attached sensor information, the answer attached sensor information of a combination of different sensors may be stored. For example, the past sensor information includes sensor information A, sensor information B, and sensor information C. The past sensor information memory 101 may store the answer attached sensor information including information indicating the duration throughout which a user corresponding to the sensor information A and a user corresponding to the sensor information B are accompanying each other, and the answer attached sensor information including information indicating the duration throughout which the user corresponding to the sensor information A, the user corresponding to the sensor information B, and a user corresponding to the sensor information C are accompanying each other.

If the past sensor information memory 101 stores two or more pieces of sensor information, the sensor information may include learning result information indicating a result of machine learning that is performed using one or more pieces of sensor information acquired in the past. The learning result information is the same information as machine learning result information generated by the machine learning unit 21 and is described below.

If the past sensor information is the sensor information or the answer attached sensor information, the past sensor information memory 101 may store time point added information corresponding to a time point of the past sensor information. The time point added information may be information to be used in the machine learning by the machine learning unit 21 or information to be used by the sensor information prediction unit 22 to acquire predictive sensor information. The time point added information may be information to be used by the accompanying user determiner 104 to narrow the answer attached sensor information. The time point added information stored on the past sensor information memory 101 may be time point added information that corresponds to the whole duration or part of the duration indicated by the time point information included in the past sensor information. The time point added information is described more in detail below.

The past sensor information may be stored on the past sensor information memory 101 in any manner. For example, the past sensor information may be stored on the past sensor information memory 101 using a recording medium. Alternatively, the past sensor information transmitted via a communication line may be stored on the past sensor information memory 101. Alternatively, the past sensor information incoming from a sensor may be stored on the past sensor information memory 101.

The sensor information receiver 102 receives the sensor information from each of the sensors worn by two or more users. The sensor information received by the sensor information receiver 102 is information acquired from the sensor worn by the same user as the user related to the past sensor information stored on the past sensor information memory 101. The sensor information received by the sensor information receiver 102 may be information acquired from the same sensor or a different sensor as long as those sensors are worn by the user corresponding to the past sensor information. The sensor information received by the sensor information receiver 102 includes the time point information as close as possible to the current time point. Typically, the sensor information stored on the past sensor information memory 101 is the sensor information that is received before the sensor information that the sensor information receiver 102 receives. The sensor information received by the sensor information receiver 102 is used to determine on a real-time basis whether the users are accompanying each other. The sensor information received by the sensor information receiver 102 may include the user identification information. If the sensor information received by the sensor information receiver 102 includes the user identification information, the user identification information may be used to associate the sensor information related to the past sensor information with the user identification information received by the sensor information receiver 102. The sensor information receiver 102 may be typically implemented using a wireless or wired communication unit.

The time point added information receiver 103 receives the time point added information, as information related to the user, corresponding to the time point indicated by the time point information included in the sensor information received by the sensor information receiver 102. The time point added information may include information, such as temperature, or weather, corresponding to a duration including time points indicated by a plurality of pieces of time point information, or information, such as a sentence in a transmitted mail, corresponding to each piece of time point information. The information related to the user may be information about an environment surrounding the user.

The time points corresponding to the time point added information received by the time point added information receiver 103 may be all or some of the time points indicated by the time point information included in the sensor information received by the sensor information receiver 102. If the time points corresponding to the time point added information are some of the time points indicated by the time point information, the time points may be N time points selected with a higher priority as closer to the latest time point included in the received sensor information, or may be N times randomly selected. Note that N is a natural number.

The information related to the user may be any information as long as the information is related to the user corresponding to any particular time point. For example, the information related to the user may be information indicating the physical condition, hunger, the symptom of an illness, and/or the seriousness of an injury of the user, as well as the contents of a talk, the contents of a transmitted mail, the contents of a received mail, the contents of a manuscript posted on the social network service (SNS), and/or a schedule of the user at any particular time point, or may be information acquired by a sensor other than the sensor used to acquire the observation information. The sensor other than the sensor used to acquire the observation information may be a calorie consumption meter or a speed meter.

The information about the environment surrounding the user may be any information as long as the information is related to the environment of the user at a particular time point. For example, the information about the environment surrounding the user may be information indicating the weather condition, the temperature, the atmospheric pressure, the humidity, and/or the hourly rain fall of an area of the user at the particular time point, as well as approximate position information and/or altitude information of the user.

Using the past sensor information and two or more pieces of the sensor information received by the sensor information receiver 102, the accompanying user determiner 104 determines whether two or more users respectively wearing two or more sensors having acquired two or more pieces of sensor information are accompanying each other at the determination time point indicating the latest time point included in the sensor information received by the sensor information receiver 102. The determination time point may be information indicating an instantaneous time point or a duration having a time width. If the determination time point indicates an instantaneous time point, the determination time point indicates a single point in the time axis. If the determination time point indicates a duration having a time width, the determination time point may indicate one minute, one second, or any other duration having a different time width.

The accompanying user determiner 104 may determine whether the users are accompanying each other, by using the answer attached sensor information or by performing machine learning. If the machine learning is to be performed to determine the accompaniment of the users, the accompanying user determiner 104 then learns the answer attached sensor information and determines the accompaniment using the sensor information indicating a duration down to the determination time point. Alternatively, the accompanying user determiner 104 may learn the past sensor information, predict the observation information at the determination time point and thereafter corresponding to the sensor information received by the sensor information receiver 102, and then determine the accompaniment of the users using the sensor information and the predicted observation information.

Figure 2:
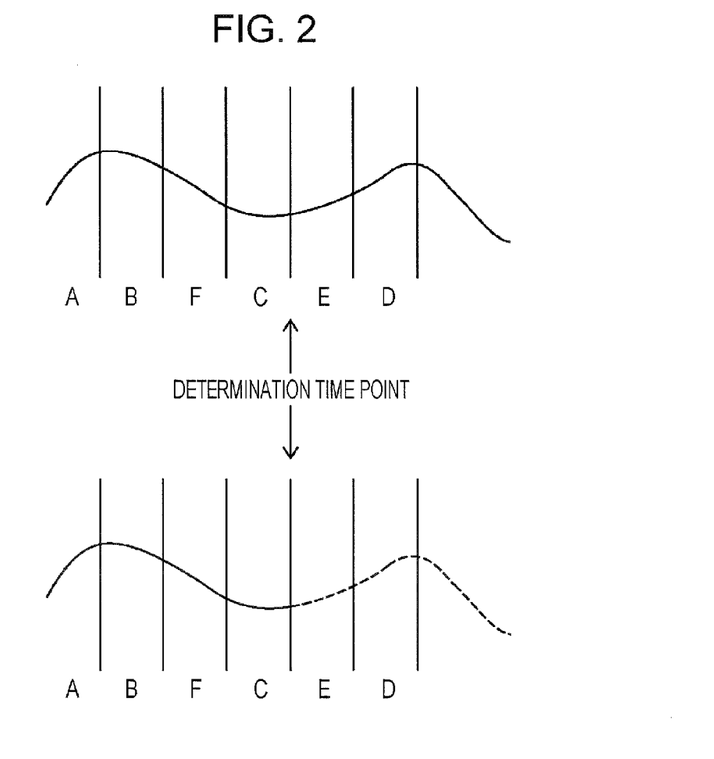
FIG. 2 illustrates an example of a prediction method of a sensor information prediction unit of the embodiment.

The accompaniment of the users may be determined using the answer attached sensor information. In such a case, the accompanying user determiner 104 determines whether a sequence of data of the observation information during a predetermined duration indicated in two or more pieces of sensor information received by the sensor information receiver 102 is similar to a sequence of data of observation information included in the answer attached sensor information of two or more users corresponding to the two or more pieces of the sensor information and determines whether the latest similar time point included in the answer attached sensor information is a time point included in an accompaniment duration throughout which the users is determined as being accompanied in accordance with the answer attached sensor information. If these conditions are satisfied, the accompanying user determiner 104 may determine that the users are accompanying with each other. The sequence of data of observation information may be a sequence of labels. To determine the accompaniment in accordance with the similarity of the sequences of labels, the accompanying user determiner 104 segments the past sensor information and the sensor information received by the sensor information receiver 102 by equal durations, such as every 10 minutes, classifies feature values during each duration, and attaches a label to each classification. The accompanying user determiner 104 uses data resulting in arranging the acquired labels sequentially for comparison. The feature value may be a median value in the duration or a mean value in the duration. For example, as illustrated in FIG. 2, the accompanying user determiner 104 may label the observation information included in the past sensor information and the sensor information received by the sensor information receiver 102. For example, one piece of observation information included in the sensor information received by the sensor information receiver 102 may be labeled "ABFC", and the observation information related to the accompaniment duration of the answer attached sensor information may be "ABFCED". The accompanying user determiner 104 then determines that one piece of sensor information is similar to one piece of answer attached sensor information. If the other received sensor information corresponding to the sensor information "ABFC" matches the sensor information corresponding to "ABFCED" out of the answer attached sensor information at the same time point information, the accompanying user determiner 104 determines that the users are accompanying each other. The "sequence of data of observation information during the predetermined duration" is preferably a sequence of data of observation information during a duration close to the determination time point included in the two or more pieces of sensor information received by the sensor information receiver 102. The predetermined duration may be empirically determined or may be calculated by performing a statistical process. The accompanying user determiner 104 may determine the accompaniment on the two pieces of sensor information by a plurality of times to determine whether the users corresponding to the two or more pieces of sensor information are accompanying each other. The accompanying user determiner 104 merges the observation information included in the two pieces of sensor information having a similar sequence of data of observation information or a similar sequence of labels, and compares the sequence of data of merged observation information with a sequence of data of other observation information. The accompanying user determiner 104 may thus determine whether two or more users corresponding to the sensor information including the merged observation information and the user corresponding to the sensor information including the other observation information are accompanying each other. A variety of methods of determining whether sequences of values, such as of a waveform or the like, are similar are disclosed in related art, and the detailed discussion thereof is omitted herein.

The time point added information corresponding to the time point of the past sensor information may be stored on the past sensor information memory 101. In such a case, the accompanying user determiner 104 may narrow the answer attached sensor information as a target for a similarity determination using the time point added information received by the time point added information receiver 103. The word group "narrow the answer attached sensor information as a target for the similarity determination" means that the similarity determination target is limited to the time point added information received by the time point added information receiver 103 and the sequence of data of observation information corresponding to the time point added information having the same or similar value at the same item.

Machine learning may be performed by the machine learning unit 21 in the accompanying user determiner 104. The machine learning unit 21 performs the machine learning using the past sensor information stored on the past sensor information memory 101 as teacher data, thus acquiring learning result information. The machine learning unit 21 may perform the machine learning to determine whether the users are accompanying each other, using two or more pieces of sensor information received by the sensor information receiver 102, or may perform the machine learning to predict the observation information at the determination time point and thereafter corresponding to the two or more pieces of sensor information received by the sensor information receiver 102. The learning result information herein refers to information obtained as a result of the machine learning.

The machine learning unit 21 performs the machine learning to determine whether the users are accompanying each other, using two or more pieces of sensor information received by the sensor information receiver 102. To this end, the machine learning unit 21 segments the observation information by duration while permitting an overlapping between durations. If the latest time point within the duration is a time point falling within a duration throughout which the answer attached sensor information indicates the accompaniment of the users, a sequence of data of observation information during the duration is treated as positive example data. If not, a sequence of data of observation information is treated as negative example data. The machine learning unit 21 thus performs the machine learning based on the positive example and the negative example data. The machine learning unit 21 may also label the observation information and convert the sequence of data of observation information into a sequence of labels. In such a case, a determination unit (not illustrated) may be used to determine whether the users corresponding to two or more pieces of sensor information received by the sensor information receiver 102 are accompanying each other.

The machine learning may be performed to predict observation information at the determination time point and thereafter of the observation information included in the two or more pieces of sensor information. In such a case, the machine learning unit 21 may perform the machine learning to predict the observation information at the determination time point and thereafter using the sequence of data of observation information included in sensor information or the answer attached sensor information. In the machine learning in this case, the learning result information corresponding to each of the two or more pieces of sensor information is preferably acquired as a result of performing the machine learning on each of the users corresponding to the two or more pieces of sensor information. This method is determined by performing the machine learning.

If the time point added information corresponding to the time point of the past sensor information is stored on the past sensor information memory 101, the machine learning unit 21 may perform the machine learning using even the time point information as features regardless of which machine learning is to be performed.

A variety of methods of determining whether sequences of values, such as of a waveform or the like, are similar are disclosed in related art and a variety of methods of predicting sequences of values, such as of a waveform or the like, are similar are disclosed in related art. The detailed discussion thereof is omitted herein.

Using the two or more pieces of sensor information received by the sensor information receiver 102 and the past sensor information, the sensor information prediction unit 22 acquires predictive sensor information as sensor information including the predicted observation information at the determination time point and thereafter corresponding to each of the two or more pieces of sensor information. The predictive sensor information includes time point information and predicted observation information corresponding to the time point information. The interval of the time point information included in the predictive sensor information may or may not be identical to the interval of the sensor information. Even if the predictive sensor information includes only the observation information predicted at regular intervals, the time point corresponding to the predicted observation information may be calculated. The predictive sensor information may be practically considered as the observation information corresponding to the time point information. The sensor information prediction unit 22 may acquire the predictive sensor information using the learning result information or without using the learning result information. When the predictive sensor information is acquired without using the learning result information, the past sensor information may be the sensor information or the answer attached sensor information. In such a case, the sensor information prediction unit 22 may identify from the past sensor information a sequence of data of observation information similar to a sequence of data of observation information corresponding to a duration closer to the determination time point included in the two or more pieces of sensor information received by the sensor information receiver 102, and may acquire as the predictive sensor information a sequence of data of observation information at and thereafter the sequence of data of similar observation information in the past sensor information. If the sensor information includes the user identification information, the sensor information prediction unit 22 preferably acquires the predictive sensor information from the past sensor information corresponding to the same user as the user corresponding to the received sensor information.

When the predictive sensor information is acquired using the learning result information, the sensor information prediction unit 22 may use the sensor information received by the sensor information receiver 102 and the learning result information to acquire the predictive sensor information as the sensor information at the determination time point and thereafter corresponding to the sensor information. The learning result information is obtained when the sensor information prediction unit 22 performs the machine learning on the past sensor information. If the learning result information to predict the observation information at the determination time point and thereafter is stored on the past sensor information memory 101 or if the machine learning unit 21 has acquired the learning result information, the sensor information prediction unit 22 may acquire the predictive sensor information using the learning result information. If the sensor information includes the user identification information, the sensor information prediction unit 22 may preferably acquire the predictive sensor information using the learning result information that has been learned using the past sensor information corresponding to the same user as the user corresponding to the received sensor information.

If the time point added information corresponding to the time point of the past sensor information is stored on the past sensor information memory 101, the sensor information prediction unit 22 may acquire the predictive sensor information using the time point added information received by the time point added information receiver 103. When the predictive sensor information is acquired using the time point added information but without using the learning result information, the sensor information prediction unit 22 may narrow the sensor information as a target for similarity determination using the time point added information received by the time point added information receiver 103. The word group "narrow the sensor information as a target" means that the target for similarity determination is limited to the time point added information received by the time point added information receiver 103 and a sequence of data of observation information corresponding to the time point added information having the same or similar value at the same item. When the predictive sensor information is acquired using the learning result information and using the time point added information, the sensor information prediction unit 22 may acquire the predictive sensor information using the learning result information as a result of machine learning that is performed using the time point added information corresponding to the past sensor information.

When the sensor information prediction unit 22 acquires the predictive sensor information, the similarity information calculation unit 23 calculates similarity information in a set of observation information responsive to the time point information corresponding to the determination time point. The set of observation information is included in a set of the sensor information and the predictive sensor information corresponding to the sensor information where the sensor information is the two or more pieces of sensor information received by the sensor information receiver 102 and the predictive sensor information corresponds to the two or more pieces of sensor information. The similarity information may be higher in value as similarity increases, or may be lower in value as similarity decreases. The similarity information may be any value. Preferably, the similarity information may be a value that is normalized to be within a specific range. The similarity information may be similarity information related to two pieces of integral sensor information or similarity information related to three or more pieces of integral sensor information. More specifically, the observation information set may include two pieces of observation information or three or more pieces of observation information. The similarity information calculation unit 23 calculates the similarity information of the two pieces of observation information at a single process. If the observation information set includes three or more pieces of observation information, the similarity information calculation unit 23 may calculate the similarity information of all combinations of the integral sensor information including the observation information, and calculate the mean value or the sum as the similarity information. The similarity information calculation unit 23 may group the integral sensor information into two groups, and calculate the similarity information using representative data of each group. When the integral sensor information is grouped, the similarity information calculation unit 23 may group the integral sensor information using information that associates a group stored on a memory (not illustrated) with the integral sensor information. Alternatively, the similarity information calculation unit 23 may group the integral sensor information so that the integral sensor information having similar observation information therewithin is in the same group. In the following discussion, a set of the sensor information and the predictive sensor information corresponding to the sensor information is also referred to as the integral sensor information. The predictive sensor information corresponding to sensor information is predictive sensor information that the sensor information prediction unit 22 has acquired using the sensor information.

The time point information corresponding to the determination time point may indicate the same time point as the determination time point, or a time point close to the determination time point. The relationship of the determination time point of "the time point information corresponding to the determination time point" with the time point information may be in a one-to-one correspondence or a one-to-multi correspondence. In the one-to-multi correspondence, the time point information corresponding to the determination time point may indicate a time point included in a sampling period including a time point prior to the determination time point and a time point subsequent to the determination time point. For this reason, the similarity information calculation unit 23 may calculate the similarity information at the determination time point using a plurality of observation information sets corresponding to the time point information indicating the time points included in the sampling period. The similarity information calculation unit 23 may calculate the similarity information by summing values of differences between two or more pieces of observation information included in the observation information sets corresponding to pieces of time point information indicated by time points included in the sampling period including the determination time point.

Figure 3:
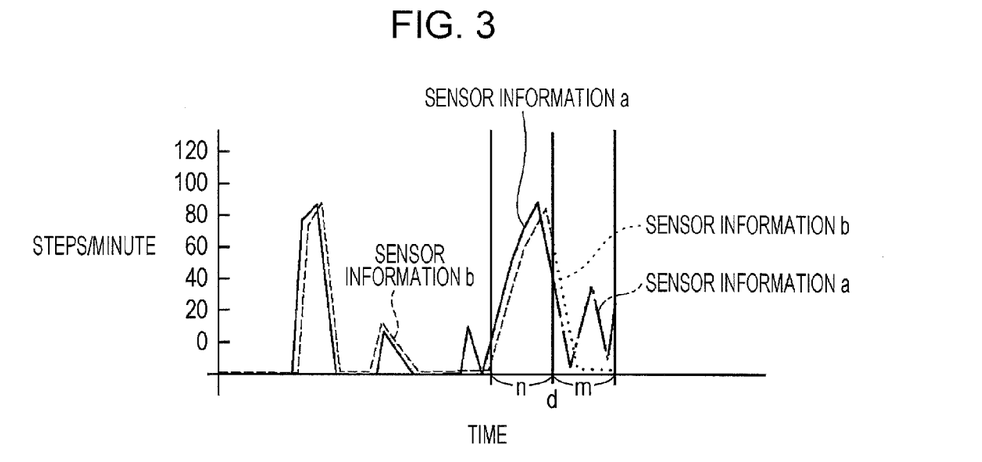
FIG. 3 illustrates an example of two pieces of sensor information of the embodiment.

An example of the sampling period is described with reference to FIG. 3. FIG. 3 illustrates sensor information a and sensor information b respectively acquired from sensor a and sensor b. The sensors in FIG. 3 record the number steps taken by a user per minute. As illustrated in FIG. 3, d represents the determination time point, n represent a duration including a time point prior to the determination time point, and m represents a duration including a time point subsequent to the determination time point. The sampling period in FIG. 3 lasts from the time point d−n to the time point d+m. In other words, the sampling period corresponds to a duration included in the sensor information received by the sensor information receiver 102 and a duration included in the predictive sensor information acquired by the sensor information prediction unit 22. Note that n and m are positive real numbers. For example, the sampling period may be 60 minutes, namely, 30 minutes prior to the determination time point and 30 minutes subsequent to the determination time point. As another example, the sampling period may be 60 seconds, namely, 30 seconds prior to the determination time point and 30 second subsequent to the determination time point.

The similarity information calculation unit 23 calculates the similarity information using the observation information set as described above. The observation information set is a combination of two or more pieces of observation information respectively included in two or more pieces of integral sensor information. More specifically, the observation information set is a set that is difficult to obtain from a single piece of integral sensor information. The observation information set may correspond to the time point information indicating the same time point or may correspond to two or more pieces of different time information closely apart. In the two or more pieces of integral sensor information, intervals of acquisition of the observation information may be different or the time points of acquisition of the observation information may be different. In that case, as well, "the observation information set corresponding to the two or more pieces of different time information closely apart" may be the observation information set that is acquired at an acquisition interval of the observation information shorter than a predetermined threshold value.

The similarity information calculation unit 23 may calculate the similarity information using the degree of similarity of a waveform of the observation information or in accordance with a predetermined formula. If the similarity information is calculated in accordance with the predetermined formula, the predetermined formula may be a formula based on a ratio of the observation information sets, a formula based on a difference between the observation information sets, or a formula obtained by modifying one of these formulas. The formula based on the ratio includes an expression (observation information a/observation information b), for example. The formula based on a difference includes an expression (observation information a−observation information b), for example. The formula based on a difference may include a formula including the value of a difference. The value of the difference may be the absolute value of a difference in the observation information, or a value resulting from squaring the difference in the observation information. The formula obtained by modifying one of these formulas may be a formula resulting from multiplying the formula of the observation information by a predetermined coefficient, a formula resulting from subtracting a predetermined value from the formula of the observation information, or a formula resulting from multiplying the formula of the observation information by a predetermined value. The method of calculating the similarity information using the degree of similarity of waveform is a related art technique, and the detailed discussion thereof is omitted herein. If the predetermined formula is used to calculate the similarity information of the two pieces of the integral sensor information, the value of difference may be used as expressed in Formula (1):

$$\alpha_d(a, b) = \sum_{t=d-n}^{d+m} (a_t^2 + b_t^2) \quad (1)$$

$$\Delta_d(a, b) = \frac{\sum_{t=d-n}^{d+m} (a_t - b_t)^2}{\alpha_d(a, b)}$$

In Formula (1), d represents the determination time point, $\alpha_d(a,b)$ represents within a range of 0.0 through 1.0 a value into which the similarity information at the determination time point d is normalized, n represents a duration from the start point of the sampling period to the determination time point d, m represents a duration from the determination time point d to the end point of the sampling period. Also, $a_t$ and $b_t$ respectively represent the observation information at time point t included in the two pieces of integral sensor information, and $(a_t-b_t)$ represents the value of the difference in the observation information set corresponding to the time point t in Formula (1). Formula (1) is the similarity information that indicates that the closer to zero the value of $\Delta_d$ is, the more similar the two pieces of integral sensor information are to each other. The similarity information calculation unit 23 may set the similarity information to be 1.0 or no value if the denominator of $\Delta_d$ in Formula (1) becomes zero. If the value of $\alpha_d$ is smaller than a predetermined threshold value, the similarity information calculation unit 23 may set the similarity information to be 1.0 or no value. If there is only a slight variation in the similarity information, a user may possibly fall asleep, and it may be considered that there is no need to use $\alpha_t$ in the calculation of the similarity information. In the following discussion, $\theta\alpha$ represents the threshold value with respect to $\alpha_d$. The calculation formula to calculate the similarity information of the two pieces of integral sensor information may be Formula (2) described below or another formula.

$$\Delta_d(a, b) = \frac{\sum_{t=d-n}^{d+m} (a_t^2 - b_t^2)}{\alpha_d(a, b)} \quad (2)$$

In Formula (2), $(a_t^2-b_t^2)$ represents a value related to the value of difference of the observation information set at time point t.

If the similarity information is similar enough to satisfy a predetermined condition, the accompaniment determination unit 24 determines that two or more users wearing sensors from which the observation information used to calculate the similarity information has been acquired are accompanying each other.

Based on the premise that the higher the value of the similarity information is, the more similar the observation information is, the predetermined condition may be that the value of the similarity information is equal to or above a predetermined threshold value. Based on the premise that the lower the value of the similarity information is, the more similar the observation information is, the predetermined condition may be that the value of the similarity information is equal to or below a predetermined threshold value. The predetermined threshold value may be determined manually or through a statistic process from the past sensor information by referencing the sensor information acquired by the sensors worn by the two users actually accompanying each other. Alternatively, the predetermined threshold value may be determined by development engineers, an administrator, or the like. The accompaniment determination unit 24 may determine whether the users corresponding to the two pieces of integral sensor information are accompanying each other, using Formula (3).

$$S_d(a,b) = \text{AND}(\alpha_d(a,b) > \theta_\alpha, \Delta_d(a,b) < \theta_\Delta) \quad (3)$$

In Formula (3), $S_d(a,b)$ is a function that is equal to 1 if the users corresponding to the sensor information a and b are accompanying each other, and is equal to zero if the users are not accompanying each other. $\theta_\alpha$ represents a threshold value with respect to a value $\alpha_d(a,b)$ that normalizes the similarity information. $\theta_\Delta$ represents a threshold value with respect to the similarity information to determine whether the users are accompanying each other. AND(argument 1, argument 2) is a function that becomes equal to 1 only when the argument 1 is equal to the argument 2, and otherwise becomes zero.

The output unit 105 outputs information indicating determination results of the accompanying user determiner 104. The output unit 105 may display the information on a display, project the information using a projector, print the information on a printer, output a sound responsive to the information, transmit the information to an external apparatus, store the information onto a recording medium, and/or transfer the information to another processing apparatus or another program.

The past sensor information memory 101 is preferably a non-volatile recording medium, but may be implemented using a volatile recording medium.

The time point added information receiver 103 may receive the time point added information from an external apparatus, from the sensor worn by the user or another apparatus, from a memory (not illustrated) using received information, from a memory (not illustrated), or from numerical keys or a keyboard. In an example of the time point added information received using the received information, a weather forecast may be received from the memory (not illustrated) using approximate position information received from the sensor.

The accompanying user determiner 104, the machine learning unit 21, the sensor information prediction unit 22, the similarity information calculation unit 23, and the accompaniment determination unit 24 are typically implemented using a micro-processing unit (MPU) and a memory. The process of the accompanying user determiner 104 may be typically performed using software. The software is recorded on a recording medium, such a read-only memory (ROM). Alternatively, the accompanying user determiner 104 may be implemented using hardware (dedicated circuit).

Figure 4:
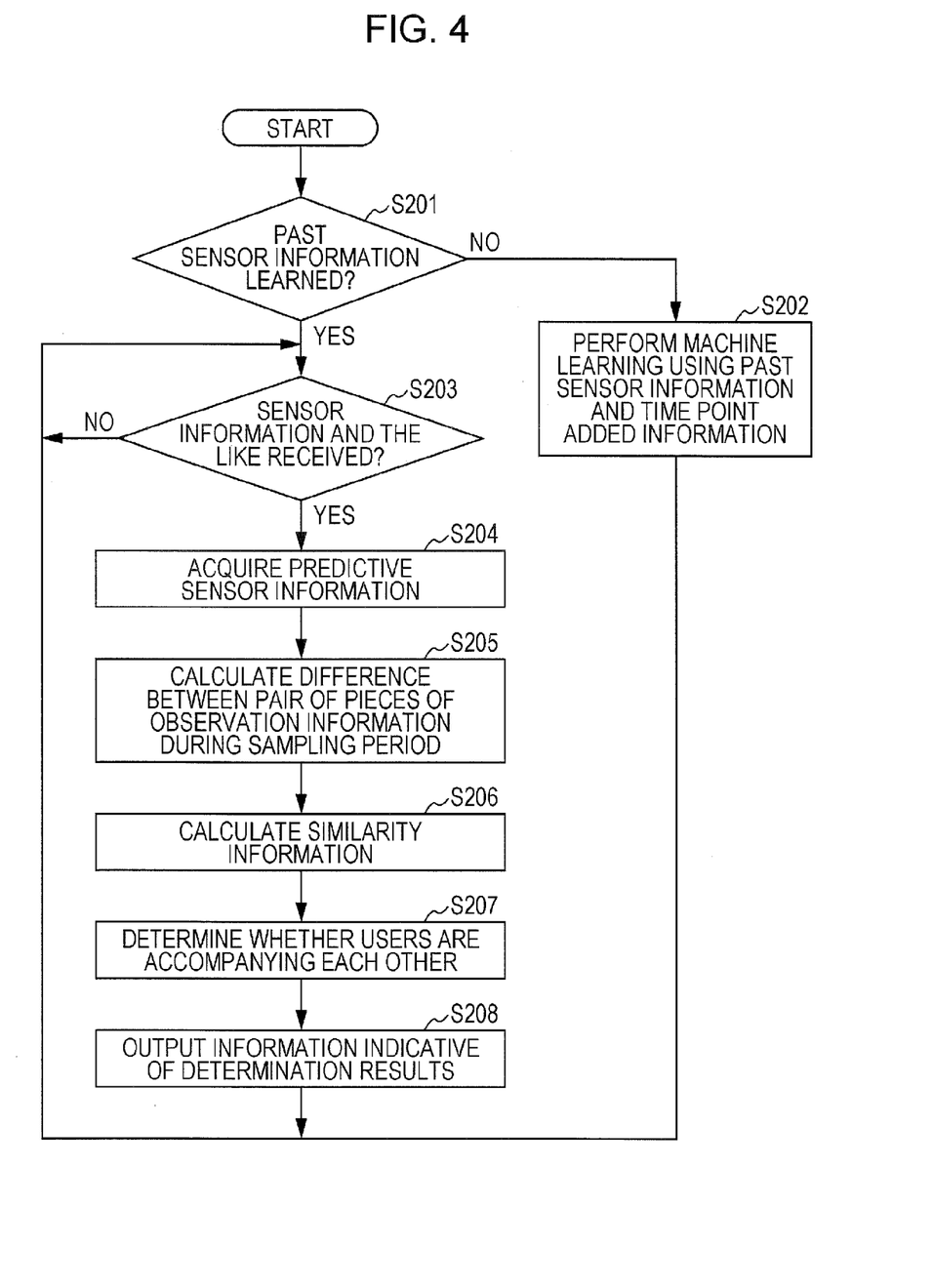
FIG. 4 is a flowchart illustrating an example of an operation of the accompaniment determination apparatus of the embodiment.

The process of the accompaniment determination apparatus 1 is described with reference to a flowchart of FIG. 4. The process in the flowchart is based on the premise that the sensor information receiver 102 receives two pieces of sensor information.

Step S201 The machine learning unit 21 determines whether the machine learning using the past sensor information stored on the past sensor information memory 101 is complete. If the machine learning is complete, processing proceeds to step S203. If the machine learning is not complete, processing proceeds to step S202.

Step S202 The machine learning unit 21 performs the machine learning using the past sensor information and the time point added information related to the past sensor information, thereby acquiring the learning result information. Processing proceeds to step S203. The machine learning unit 21 stores the learning result information on a memory (not illustrated).

Step S203 The sensor information receiver 102 determines whether the sensor information receiver 102 has received two pieces of sensor information. The time point added information receiver 103 determines whether the time point added information receiver 103 has received the time point added information. If the two pieces of sensor information and the time point added information have been received, processing proceeds to step S204. Otherwise, the operation in step S203 is repeated. The sensor information receiver 102 stores the received sensor information on the memory (not illustrated), and the time point added information receiver 103 stores the received time point added information on the memory (not illustrated).

Step S204 The sensor information prediction unit 22 acquires the predictive sensor information of each of the two pieces of sensor information using the learning result information acquired in step S202, and the two pieces of sensor information and time point added information received in step S203. The sensor information prediction unit 22 stores the acquired predictive sensor information on the memory (not illustrated). Note that the sensor information prediction unit 22 may also use the sensor information previously acquired by the sensor information receiver 102.

Step S205 The similarity information calculation unit 23 calculates the value related to the value of difference of each observation information set corresponding to the time point information indicating the time points included in the sampling period. The similarity information calculation unit 23 stores the calculated value of difference on the memory (not illustrated).

Step S206 The similarity information calculation unit 23 calculates the similarity information using the value related to the value of difference acquired in step S205. The similarity information calculation unit 23 stores the calculated value on the memory (not illustrated).

Step S207 The accompaniment determination unit 24 determines the users are accompanying each other, using the similarity information calculated in step S206. If the similarity information is equal to or lower than the threshold value, the accompaniment determination unit 24 determines that the users are accompanying each other. For example, the accompaniment determination unit 24 calculates the similarity information in accordance with Formula (3). The accompaniment determination unit 24 stores the calculated determination result on the memory (not illustrated).

Step S208 The output unit 105 outputs the determination result obtained in step S207. Processing returns to step S203.

The process of the flowchart of FIG. 3 quits when power is down or in response to an interruption of a process end.

A specific process of the accompaniment determination apparatus 1 of the present embodiment is described below. In the specific process, the accompaniment determination apparatus 1 determines whether user A and user B are currently accompanying each other. In the specific process, the past sensor information is sensor information that the sensors worn by the user A and the user B acquired during the past one year. In the specific process, the accompaniment determination apparatus 1 receives the sensor information including the observation information received during the latest 30 minutes from the sensor worn by the user A. The accompaniment determination apparatus 1 also receives the sensor information including the observation information received during the latest 30 minutes from the sensor worn by the user B. The time point added information may include information indicating temperature. In the specific process, the sampling period is the sum of 30 minutes prior to the determination time point and 30 minutes subsequent to the determination time point. In other words, the sampling period is 60 minutes. If the similarity information is equal to or below the predetermined threshold value in the specific process, the accompaniment determination unit 24 determines that the users are accompanying each other.

Figure 5:
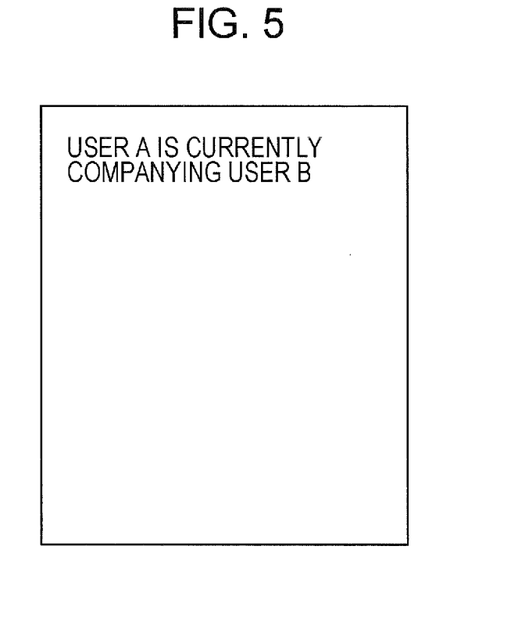
FIG. 5 illustrates an example of a result displayed by an output unit of the embodiment.

The administrator of the accompaniment determination apparatus 1 may now switch on the accompaniment determination apparatus 1 to start the process. Upon detecting no storage of the learning result information as a result of learning the past sensor information stored on the past sensor information memory 101, the machine learning unit 21 performs the machine learning on each piece of sensor information using the past sensor information of the past one year and the time point added information related to temperature corresponding to the past sensor information. The machine learning unit 21 thus acquires the learning result information to acquire the predictive sensor information of the user A and the prediction result information of the user B (step S201 and step S202). When the machine learning unit 21 acquires the learning result information, the sensor information receiver 102 and the time point added information receiver 103 start to receive the sensor information and the time point added information related to temperature, respectively. For example, the sensor information receiver 102 may now receive the sensor information a from the sensor worn by the user A and the sensor information b from the sensor B worn by the user B, and the time point added information receiver 103 receives the time point added information "15 degrees" from the sensor worn by the user A and the time point added information "15 degrees" from the sensor worn by the user B (step S203). The sensor information prediction unit 22 thus acquires the predictive sensor information x for 30 minutes subsequent to the determination time point using the sensor information a and the time point added information "15 degrees" for 30 minutes of the user A, and acquires the predictive sensor information y for 30 minutes subsequent to the determination time point using the sensor information b and the time point added information "15 degrees" for 30 minutes of the user B (step S204). The similarity information calculation unit 23 calculates the value related to the value of difference in the observation information set corresponding to the sampling period (step S205). The similarity information calculation unit 23 calculates the similarity information during the sampling period from the calculated value related to the difference (step S206). In response to the calculated similarity information, the accompaniment determination unit 24 determines whether the users are accompanying each other (step S207). The accompaniment determination unit 24 may now determine that the users are accompanying each other. When the accompaniment determination unit 24 completes the accompaniment determination, the output unit 105 outputs a message "user A is now accompanying user B" as the accompaniment determination result to a display (step S208). The display thus displays the message as illustrated in FIG. 5.

In accordance with the present embodiment, the accompaniment determination apparatus 1 determines on a real-time basis whether two or more users are accompanying each other, without collecting position information. With the sensor information prediction unit 22 acquiring the predictive sensor information and performing the prediction operation, the accompaniment determination apparatus 1 determines on a real-time basis whether two or more persons are accompanying each other. The machine learning unit 21 learns the past sensor information, therey acquiring the predictive sensor information at a high accuracy. The accompaniment determination apparatus 1 thus increases the accuracy level in the accompaniment determination as to whether the users are accompanying each other. With the time point added information receiver 103 receiving the time point added information, the accompaniment determination apparatus 1 performs the prediction operation in view of other factors as well as the sensor information. With the similarity information calculation unit 23 calculating the similarity information, the accompaniment determination apparatus 1 determines whether the users are accompanying each other, by using the similarity information of the sensor information. Since the similarity information calculation unit 23 calculates the similarity information during the sampling period, the similarity information accounting for small errors in the acceleration detected by the sensor is obtained. Using the sensor counting the number of steps, the accompaniment determination apparatus 1 determines whether two or more users are accompanying each other, without using position information.

In the present embodiment, the accompaniment determination apparatus 1 configured to determine on a real-time basis whether the users are accompanying each other has been described. The accompaniment determination apparatus 1 may calculate relation intensity information of users corresponding to two pieces of sensor information received by the sensor information receiver 102. The relation intensity information is a value indicating the intensity of relationship between the two users wearing the sensors. As the relation intensity information indicates a higher intensity of the relationship, the accompaniment determination unit 24 determines with a higher possibility that the users are accompanying each other. More specifically, as the period throughout which the users are accompanying each other is determined to be longer, the relation intensity information indicates a higher intensity of the relationship. The relation intensity information is preferably a numerical value, but may be information other than a numerical value. For example, the relation intensity information may be stepwise level information, such as "strong", "weak", and "none". The relation intensity information may be the number of times by which the accompaniment determination unit 24 determines that the users corresponding to the two sensors are accompanying each other, or may be a value calculated from the determined number of times of accompaniment. The relation intensity information may be calculated in accordance with Formula (4):

$$W = \sum_{t=Ts}^{Te} \delta_t \quad (4)$$

$$\delta_t = \prod_{\tau=t}^{t+c} S_\tau(a, b)$$

In Formula (4), W represents the relation intensity information, Ts represents a first time point of a target duration over which the relation intensity information is circulated, Te represents a last time point of the target duration over which the relation intensity information is calculated, and c represents a duration holding that δt equals 1 within a duration throughout which the users are determined to be accompanying each other.

In the present embodiment, the same receiver may be shared by the sensor information receiver 102 and the time point added information receiver 103. The receiver may be a processing unit that sorts received information to information for the sensor information receiver 102 or information for the time point added information receiver 103 depending on the received information.

In the present embodiment, the accompaniment determination apparatus 1 includes the time point added information receiver 103. The accompaniment determination apparatus 1 may not necessarily have to include the time point added information receiver 103. If the accompaniment determination apparatus 1 does not include the time point added information receiver 103, the process to use the time point added information may not be performed.

In the present embodiment, the accompaniment determination apparatus 1 includes the machine learning unit 21. The accompaniment determination apparatus 1 may not necessarily have to include the machine learning unit 21. If the accompaniment determination apparatus 1 does not include the machine learning unit 21, the sensor information prediction unit 22 may acquire the predictive sensor information using the learning result information produced by an external processing apparatus and stored on the past sensor information memory 101. The accompaniment determination apparatus 1 may not necessarily have to include the sensor information prediction unit 22, the similarity information calculation unit 23, and the accompaniment determination unit 24. If the accompaniment determination apparatus 1 does not include the sensor information prediction unit 22, the similarity information calculation unit 23, and the accompaniment determination unit 24, the accompanying user determiner 104 may determine whether the users are accompanying each other, using the learning result information produced by the external processing apparatus and stored on the past sensor information memory 101.

The software implementing the accompaniment determination apparatus 1 of the present embodiment may be a program described below. The program causes a computer that accesses a past sensor information memory to perform as a sensor information receiver, an accompanying user determiner and an output unit. The past sensor information stores past sensor information, the past sensor information associating observation information acquired by sensors respectively worn by two or more users with time point information indicating a time point at which the observation information is acquired. The sensor information receiver receives sensor information from the sensor worn by each of the two or more users. The accompanying user determiner determines at a determination time point indicating the latest time point included in the sensor information whether the two or more users wearing the sensors from which the sensor information is acquired are accompanying each other, using the past sensor information and the sensor information received by the sensor information receiver. The output unit outputs information indicating a determination result determined by the accompanying user determiner.

In the present embodiment, each process (function) may be centrally controlled by a single apparatus (system), or may be processed in a distributed fashion by a plurality of apparatuses. In the present embodiment, two or more communication units in one apparatus may be implemented by one physical unit.

In the present embodiment, each element may be implemented using dedicated hardware. An element that may be implemented using software may be implemented by executing the software program. For example, the software program recorded on a hard disk or a semiconductor memory may be read and then executed by a program executing unit, such as a central processing unit (CPU). Each element is thus implemented.

The functions implemented by the program are free from any function that may be implemented only by hardware. For example, in an acquisition unit to acquire information or an output unit to output information, a modem or an interface card, which is implemented only by hardware, is not included in the functions implemented by the program.

Figure 6:
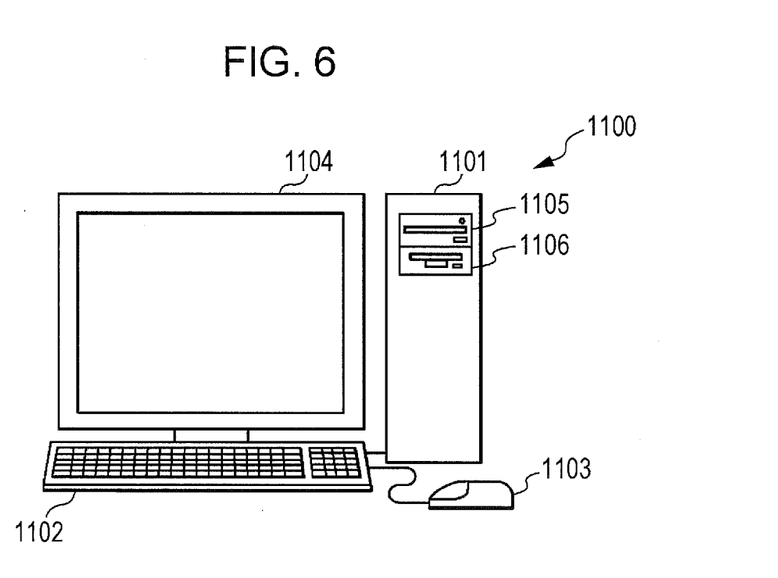
FIG. 6 is an external view of a computer system of the embodiment.

FIG. 6 diagrammatically illustrates a computer implementing the embodiment of the present invention. The present embodiment is implemented by the computer as hardware and the computer program that is executed on the computer.

As illustrated in FIG. 6, a computer system 1100 include a computer 1101 including a compact disk read-only memory (CD-ROM) drive 1105, and a flexible disk (FD) drive 1106, a keyboard 1102, a mouse 1103, and a display 1104.

Figure 7:
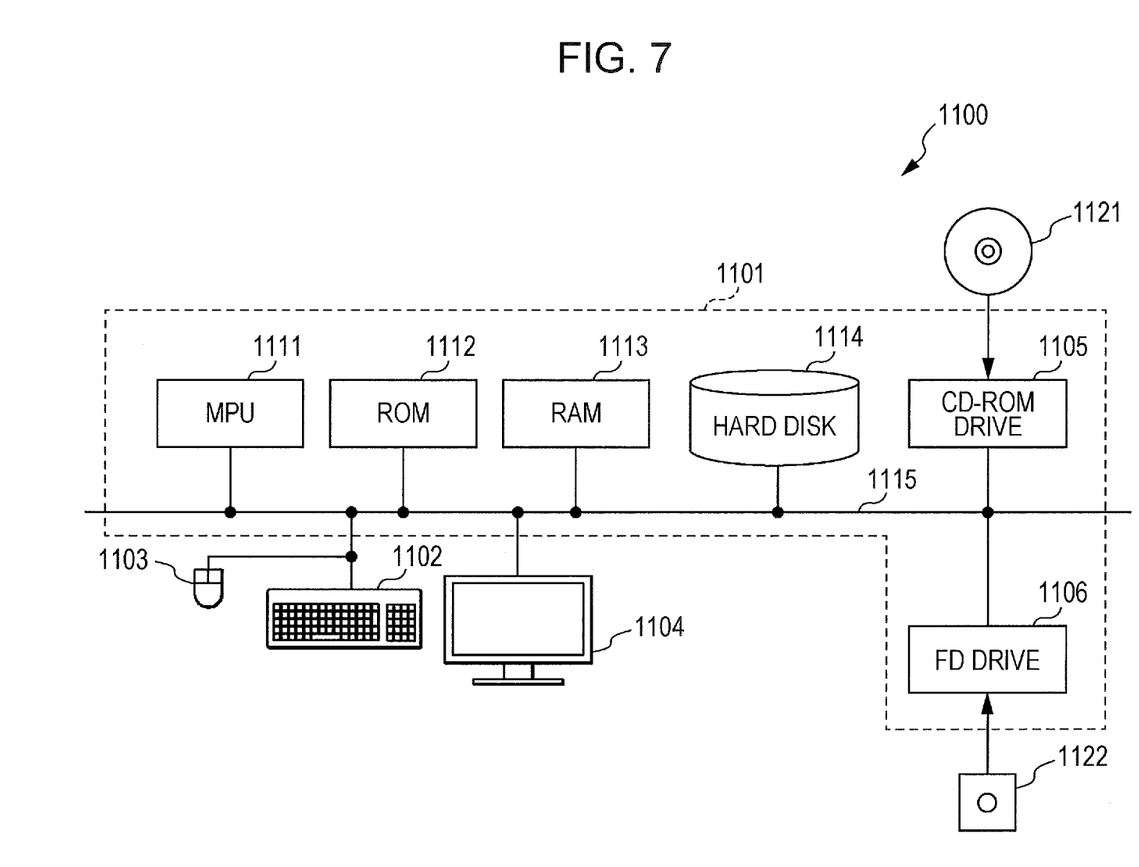
FIG. 7 illustrates a configuration example of the computer system of the embodiment.

FIG. 7 illustrates an internal structure of the computer system 1100. As illustrated in FIG. 7, the computer 1101 includes a micro-processor unit (MPU) 1111, a ROM 1112, a random-access memory (RAM) 1113, a hard disk 1114, and a bus 1115, in addition to the CD-ROM drive 1105, and the FD drive 1106. The ROM 1112 stores programs including an bootup program. The RAM 1113 temporarily stores an instruction of an application program and provides a temporary storage space. The hard disk 1114 stores stores the application program, a system program, and data. The bus 1115 interconnects the MPU 1111, the ROM 1112, and other elements. The computer 1101 may include a network card (not illustrated) that permits connection to a local area network (LAN).

The program that causes the computer system 1100 to perform the functions of the present embodiment of the invention is stored on the CD-ROM 1121 or an FD 1122. The CD-ROM or the FD 1122 is then inserted into the CD-ROM drive 1105 or the FD drive 1106. The program may be transferred to the hard disk 1114. Alternatively, the program may be transmitted to the computer 1101 via a network (not illustrated) and then stored on the hard disk 1114. The program is then loaded onto the RAM 1113 to be executed. Alternatively, the program may be directly loaded onto the RAM 1113 from the CD-ROM 1121 or the FD 1122, or via the network.

The program may not necessarily have to include an operating system (OS) that causes the computer 1101 to perform the functions of the present embodiment or a third-party program. The program may include only a command portion to invoke an appropriate function (module) in a controlled form and to obtain a desired result. The operation of the computer system 1100 is known and the detailed description thereof is omitted herein.

The present invention is not limited to the present embodiment. Various modifications are possible and falls within the scope of the present invention. In the present invention, the "unit" may be interpreted as a "section" or a "circuit".

The accompaniment determination apparatus of the present embodiment determines on a real-time basis that two users are accompanying each other, using sensor information without collecting position information.

What is claimed is:

1. An accompaniment determination apparatus, comprising:
   a past sensor information memory configured to store past sensor information, the past sensor information associating observation information acquired by sensors respectively worn by two or more users with time point information indicating a time point at which the observation information is acquired;
   a sensor information receiver configured to receive sensor information from the sensor worn by each of the two or more users;
   an accompanying user determiner configured to determine at a determination time point indicating a latest time point included in the sensor information whether the two or more users wearing the sensors from which the sensor information is acquired are accompanying each other, using the past sensor information and the sensor information received by the sensor information receiver; and
   an output unit configured to output information indicating a determination result determined by the accompanying user determiner.

2. The accompaniment determination apparatus according to claim 1, wherein the accompanying user determiner comprises:
   a sensor information prediction unit configured to acquire predictive sensor information as the sensor information at the determination time point and thereafter corresponding to the sensor information, using the sensor information received by the sensor information receiver, and the past sensor information;
   a similarity information calculation unit configured to calculate similarity information related to similarity between a set of observation information, corresponding to time point information at the determination time point, the set of observation information included in a set of the sensor information received by the sensor information receiver and the predictive sensor information corresponding to the received sensor information; and
   an accompaniment determination unit configured to determine at the determination time point whether the two or more users wearing the sensors having acquired the observation information used to calculate the similarity information are accompanying each other if the similarity information is similar enough to satisfy a predetermined condition.

3. The accompaniment determination apparatus according to claim 2, wherein the accompanying user determiner further comprises a machine learning unit configured to perform machine learning with the past sensor data stored on the past sensor information memory serving as teacher data to acquire learning result information, and
   wherein the sensor information prediction unit acquires the predictive sensor information corresponding to the sensor information using the sensor information received by the sensor information receiver and the learning result information.

4. The accompaniment determination apparatus according to claim 3, further comprising a time point added information receiver configured to receive time point added information, as information related to a user, at a time point indicated by time point information included in the sensor information received by the sensor information receiver,
   wherein the past sensor information memory stores the time point added information at a time point related to the past sensor information, wherein the machine learning unit performs machine learning using the time point added information stored on the past sensor information memory, and wherein the sensor information prediction unit acquires the predictive sensor information using the time point added information received by the time point added information receiver.

5. The accompaniment determination apparatus according to claim 2, wherein the similarity information calculation unit calculates the similarity information at the determination time point using a plurality of observation information sets respectively corresponding to pieces of time point information indicating time points included in a sampling period including a time point prior to the determination time point and a time point subsequent to the determination time point.

6. The accompaniment determination apparatus according to claim 5, wherein the similarity information calculation unit calculates the similarity information that is a sum of values related to a difference between two or more pieces of observation information included in each of the observation information sets respectively corresponding to the pieces of time point information indicating time points included in the sampling period including the determination time point.

7. An accompaniment determination method, comprising:
   storing past sensor information, the past sensor information associating observation information acquired by sensors respectively worn by two or more users with time point information indicating a time point at which the observation information is acquired;
   receiving sensor information from the sensor worn by each of the two or more users;
   determining at a determination time point indicating a latest time point included in the sensor information whether the two or more users wearing the sensors from which the sensor information is acquired are accompanying each other, using the past sensor information and the received sensor information; and
   outputting information indicating a result of the determining.

8. A computer readable storage medium storing a program causing a computer to execute a process for determining accompaniment, the process comprising:
   storing past sensor information, the past sensor information associating observation information acquired by sensors respectively worn by two or more users with time point information indicating a time point at which the observation information is acquired;
   receiving sensor information from the sensor worn by each of the two or more users;
   determining at a determination time point indicating a latest time point included in the sensor information whether the two or more users wearing the sensors from which the sensor information is acquired are accompanying each other, using the past sensor information and the received sensor information; and
   outputting information indicating a result of the determining.

* * * * *